(12) United States Patent
Bruich et al.

(10) Patent No.: US 9,679,044 B2
(45) Date of Patent: Jun. 13, 2017

(54) ASSIGNING SOCIAL NETWORKING SYSTEM USERS TO HOUSEHOLDS

(71) Applicant: Facebook, Inc., Menlo Park, CA (US)

(72) Inventors: Sean Michael Bruich, Palo Alto, CA (US); Bradley Hopkins Smallwood, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 658 days.

(21) Appl. No.: 13/677,885

(22) Filed: Nov. 15, 2012

(65) Prior Publication Data

US 2013/0151527 A1 Jun. 13, 2013

Related U.S. Application Data

(60) Provisional application No. 61/560,287, filed on Nov. 15, 2011.

(51) Int. Cl.
*G06F 7/00* (2006.01)
*G06F 17/30* (2006.01)

(52) U.S. Cl.
CPC .. *G06F 17/30598* (2013.01); *G06F 17/30867* (2013.01)

(58) Field of Classification Search
CPC ............... G06Q 30/02; G06Q 30/0269; G06Q 30/0255; G06Q 30/0254; G06Q 50/01; G06Q 30/0241; G06Q 30/0201; G06Q 30/0242; G06Q 30/0277; H04L 67/306; H04L 29/08936
USPC ........................................................ 707/737
See application file for complete search history.

(56) References Cited

U.S. PATENT DOCUMENTS

| 8,073,807 | B1 | 12/2011 | Srinivasaiah |
| 2001/0037348 | A1* | 11/2001 | Nakada ............. G06F 17/30867 715/248 |
| 2003/0177055 | A1 | 9/2003 | Zimmerman, Jr. et al. |
| 2006/0253328 | A1* | 11/2006 | Kohli ..................... G06Q 30/02 705/14.53 |
| 2006/0271507 | A1* | 11/2006 | Anzalone .......... G06F 17/30592 |
| 2006/0271568 | A1* | 11/2006 | Balkir .................... G06Q 10/10 |
| 2007/0250325 | A1* | 10/2007 | Currey .................. G06Q 10/08 705/1.1 |

(Continued)

*Primary Examiner* — Binh V Ho
(74) *Attorney, Agent, or Firm* — Fenwick & West LLP

(57) ABSTRACT

Users of a social networking system are assigned to households using prediction models that rely, in part, on user profile information and social graph data. Information about users may be received by a social networking system through various channels (e.g., declared/profile information, user history, IP addresses, Global Positioning System (GPS) data from check-in events and/or continuously provided by mobile devices, external household information, and/or social information). Scoring models may use statistical analysis of the received user information to predict household membership for users. User attributes, such as previous names, date of birth, social graph data, locations, life events, and check-ins, may be factors in generating confidence scores of predicted household memberships. Weighted scoring models may use machine learning methods for measuring the accuracy of the household membership prediction. The social networking system may use a machine learning algorithm to analyze user information to determine confidence scores for matching potential households.

50 Claims, 4 Drawing Sheets

(56) References Cited

U.S. PATENT DOCUMENTS

| | | | |
|---|---|---|---|
| 2008/0127249 A1* | 5/2008 | Cruice | G06Q 30/02 725/34 |
| 2008/0162260 A1* | 7/2008 | Rohan | G06Q 30/02 705/14.4 |
| 2008/0184289 A1* | 7/2008 | Cristofalo | G06Q 30/00 725/34 |
| 2008/0300964 A1* | 12/2008 | Raghunandan | G06Q 30/02 705/14.66 |
| 2008/0306895 A1 | 12/2008 | Karty | |
| 2009/0063284 A1* | 3/2009 | Turpin | G06Q 30/02 705/14.61 |
| 2009/0106085 A1 | 4/2009 | Raimbeault | |
| 2009/0198711 A1* | 8/2009 | Datar | G06Q 30/02 |
| 2009/0307073 A1 | 12/2009 | Mirroknibanadaki et al. | |
| 2010/0037255 A1* | 2/2010 | Sheehan | H04N 7/17336 725/34 |
| 2011/0029383 A1* | 2/2011 | Engel | G06F 3/0488 705/14.53 |
| 2011/0029385 A1* | 2/2011 | Engel | G06Q 30/02 705/14.53 |
| 2011/0087550 A1 | 4/2011 | Fordyce, III et al. | |
| 2011/0258552 A1* | 10/2011 | White | G06Q 10/10 715/739 |
| 2012/0036053 A1* | 2/2012 | Miller | G06Q 40/02 705/31 |
| 2012/0110071 A1* | 5/2012 | Zhou | G06Q 10/10 709/204 |
| 2012/0166285 A1* | 6/2012 | Shapiro | G06Q 30/0251 705/14.58 |
| 2013/0006778 A1* | 1/2013 | Raghunandan | G06Q 30/0269 705/14.66 |
| 2013/0055309 A1* | 2/2013 | Dittus | H04N 21/2668 725/35 |
| 2013/0097182 A1* | 4/2013 | He | G06F 17/3071 707/748 |
| 2013/0276027 A1* | 10/2013 | Sheehan | H04N 7/17336 725/35 |

\* cited by examiner

ASSIGNING SOCIAL NETWORKING SYSTEM USERS TO HOUSEHOLDS

BACKGROUND

This invention relates generally to social networking, and in particular to assigning users of a social networking system to households for tracking advertising metrics.

Traditional market researchers rely on panels of sample households to track various metrics. For example, a market researcher may identify a household that includes a married couple with one child to represent the consumption and spending habits of a million households based on the metrics surveyed by the market researcher. Advertisers, in an effort to provide relevant advertisements, may use this market research to target their advertisements based on the metrics obtained from these panels of sample households. Market researchers may track these households, which may change in composition and geographic location, using magazine subscriptions, state department of motor vehicle registrations, and voter registration records. As a result, market researchers may effectively estimate how certain demographics, such as males aged 20-24, may react to a certain advertisement based on the past consumption behaviors of the panels of sample households.

In recent years, users of social networking systems have shared their interests and engaged with other users of the social networking systems by sharing photos, real-time status updates, playing social games, and sharing their geographic locations. The amount of information gathered from users is staggering—especially as users have adopted mobile devices that enable users to update their close friends and acquaintances on the social networking system with their locations and interests in real-time, at any hour of the day. Social networking systems have been passively recording this information as part of the user experience, but social networking systems have lacked tools to use market research information in tracking advertising metrics.

Specifically, user information available on a social networking system has not been used to assign users of the social networking system to households relied upon by market researchers. Market researchers that seek to provide insight on how a target demographic of users of a social networking system may react to viewing content, such as watching and interacting with an advertisement for a travel destination, may be unable to identify the users on the social networking system that are included in the households because of privacy issues as well as uncertainty about the authenticity of the users. Consequently, existing systems have not been able to accurately identify sample households of users that may be used to represent populations of users of social networking systems.

SUMMARY

Users of a social networking system may be assigned to households using prediction models that rely, in part, on user profile information and social graph data. Information about users may be received by a social networking system through various channels (e.g., declared/profile information, user history, IP addresses, Global Positioning System (GPS) data from check-in events and/or continuously provided by mobile devices, external household information, and/or social information). The scoring models may rely on statistical analysis of the received user information to predict household membership for users of the social networking system. User attributes, such as previous names, date of birth, social graph data, locations, life events, and check-ins, may be used as factors in generating confidence scores of predicted household memberships. Weighted scoring models may be generated and trained using machine learning methods using information about the accuracy of the household membership prediction. In one embodiment, the social networking system uses a machine learning algorithm to analyze user information to determine confidence scores for matching potential households.

Figure 1:
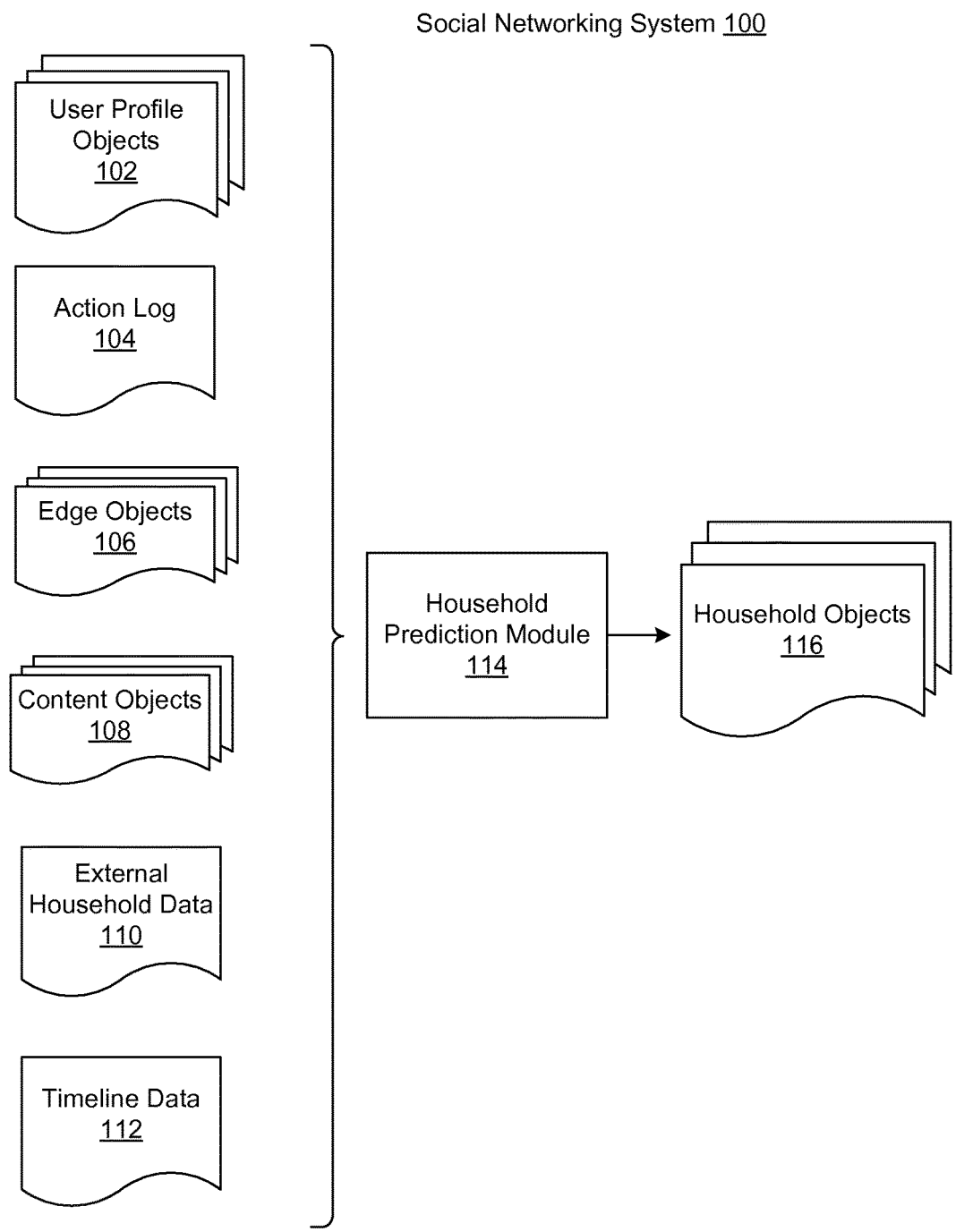
FIG. 1 is high-level block diagram illustrating a process of assigning users of a social networking system to households, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the social networking system. Users join the social networking system and add connections to a number of other users to whom they desire to be connected. Users of social networking system can provide information describing them, which is stored as user profiles. For example, users can provide their age, gender, geographical location, education history, employment history and the like. The information provided by users may be used by the social networking system to direct information to the user. For example, the social networking system may recommend social groups, events, and potential friends to a user. The social networking system may also use user profile to direct advertisements to the user, ensuring that only relevant advertisements are directed to the user. Relevant advertisements ensure that advertising spending reaches their intended audiences, rather than wasting shrinking resources on users that are likely to ignore the advertisement.

In addition to declarative information provided by users, social networking systems may also record users' actions on the social networking system. These actions include communications with other users, sharing photos, interactions with applications that operate on the social networking system, such as a social gaming application, responding to a poll, adding an interest, and joining an employee network. A social networking system may also be able to capture external website data that is accessed by its users. This external website data may include websites that are frequently visited, links that are selected, and other browsing data. Information about users, such as stronger interests in particular users and applications than others based on their behavior, can be generated from these recorded actions through analysis and machine learning by the social networking system.

Further, a user profile for a user is often not complete, and it may not be completely accurate. For example, users may deliberately provide incorrect information, such as providing incorrect age in the user profile. Users may also forget to update their information when it changes. For example, a user may move to a new location and forget to update the user's geographical location, or a user may change jobs but forget to update the workplace description in his or her user profile. As a result, a social networking system may infer certain profile attributes of a user, such as geographic location, educational institutions attended, and age range, by analyzing the user's connections and their declared profile information. Inferring profile attributes are further discussed in U.S. application Ser. No. 12/916,322, filed on Oct. 29, 2010, which is hereby incorporated by reference.

Location information about users may be received by the social networking system through various communication channels. Users may designate a current home location in their profiles on the social networking system. Users may also indicate their presence at events that include geographic locations, such as an address of a bar where a cocktail party is being attended. Users may also share their geographic location with other users of the social networking system in real-time using GPS-enabled mobile devices. In one embodiment, a user's IP address may be mapped to a particular geographic region by the social networking system. Location information about other users connected to a user on the social networking system may be used to infer the location of the user. Inferring locations of users of a social networking system is further discussed in "Predicting Locations of Users of a Social Networking System," U.S. application Ser. No. 13/235,206, filed on Sep. 16, 2011, which is hereby incorporated by reference.

Market researchers rely on panels of households in measuring the consumption and viewing habits of different markets of the world. Households may be defined as groups of people that have been selected to represent populations based on their characteristics. Market researchers use households to provide statistically valid measurements of the effectiveness of advertising campaigns to advertisers, track purchases of products across different demographics, and analyze the reach and frequency of households viewing content, such as advertisements or other media. Third-party market researchers may enable a social networking system to identify members of households among the users of the social networking system.

FIG. 1 illustrates a high-level block diagram of a process for assigning users of a social networking system to households, in one embodiment. The social networking system 100 uses different types of information about users in the process of predicting household membership of users, including user profile objects 102, an action log 104, edge objects 106, content objects 108, external household data 110, and timeline data 112. Each user of the social networking system 100 is associated with a specific user profile object 102. These user profile objects 102 include declarative information about the user that was explicitly shared by the user as well as any profile information inferred by the social networking system 100. In one embodiment, a user profile object 102 may include one or more different data fields, each data field describing an attribute of the corresponding user of the social networking system 100. One data field in the user profile object 102 for a first user may include an association with another user profile object 102 for a second user indicating that the first user and the second user are living in the same household.

Users of the social networking system 100 may take actions using the social networking system 100 that are associated with one or more objects. Information describing these actions is stored in the action log 104. The action log 104 includes many different types of interactions that occur on a social networking system, including attending an event that includes a physical location, checking-in at a physical location using a GPS-enabled user device, and tagging locations in content items, such as a status message, video, and photo album. Additionally, the action log 104 records a user's interactions with objects on the social networking system 100, such as a poll question that asks whether the user is connected to another user in a household.

Edge objects 106 store information about users' connections on a social networking system 100. Such information may include the interactions between the user and other objects on the social networking system 100, including wall posts, comments on photos, geographic places, and tags in photos. Edge objects 106 may also include location information of other users of the social networking system 100 that are connected to a user. For example, a user may be "checked-in" by another user of the social networking system 100 using a GPS-enabled user device. As a result, the location information captured by the GPS-enabled user device may be stored in the edge object 106 between the users of the social networking system 100. Further, the edge object 106 between the connected users included in the check-in event may indicate that the connection is stronger than the connection between users that do not interact with each other as frequently. This type of connection information, extracted from edge objects 106, may be used by the social networking system 100 in assigning users of the social networking system 100 to households.

Users may interact with various content objects 108 on the social networking system 100, such as videos, photos, events, check-in events, status messages, and the like. Content objects 108 may include geographic location information about a user. For example, if a user tags another user in a status update in San Francisco very frequently over an extended time period, the social networking system 100 may use that information in assigning the users to a household during that time period. Other content objects 108, such as photos and check-in events, may also have information that may be extracted by the social networking system 100 to be used in assigning users to households.

External household data 110 may be used by a social networking system 100 to predict locations of users. External household data 110 may include offline household information retrieved by the social networking system 100 from one or more third-party external systems, such as department of motor vehicle records, magazine subscriptions, voter registration records, postal service mailing address changes, catalogs, and other transactional data, such as purchasing data at retailers. This external household data 110 may include information about households, such as names of persons living in a household, an address associated with a household, previous addresses associated with a household, vehicles owned by members of a household, magazines subscribed to by members of a household, television shows and other media consumed by members of a household, contact information about members of the household, and the like. The social networking system 100 may use external household data 110 in assigning users of the social networking system 100 to households using previous names, addresses, and contact information extracted from the external household data 110, in one embodiment.

In another embodiment, external household data 110 includes IP address location mapping information that may be used by a social networking system 100 to map users' IP addresses to geographic locations. A user connects to the Internet through an Internet Service Provider (ISP) that assigns an IP address to the user. The social networking system 100 may retrieve the user's IP address and use the IP address location mapping information to identify a geographic location that is associated with the user's IP address. Using the geographic location mapped by the IP address, the social networking system 100 may better predict the household membership for the user associated with the IP address.

Timeline data 112 may be received by the social networking system 100 in response to a user updating events on a timeline for the user, in one embodiment. A timeline for a user of the social networking system 100 represents a collection of events and actions that are indicated as meaningful to the user, in one embodiment. These events and actions may include making new connections on the social networking system 100, installing and using applications on the social networking system 100, posting check-in events in a certain geographic location during a certain time period, uploading photos that are relevant to a specific event, such as a vacation, and lifetime events marked by a user as important, such as moving to a new city, starting a new job, graduating from college, starting and/or ending a romantic relationship, the birth of children, engagements, marriages, and the like. Timeline data 112 may include a reference to content objects representing these events and actions, such as edge objects 106 and content objects 108. Timeline data 112 may be given special weight in assigning users to households based on the user's indication that the event or action has special significance as a "lifetime event," in one embodiment.

Membership in households for users of a social networking system 100 may be predicted using a household prediction module 114. The household prediction module 114 uses information received about users of the social networking system 100 to generate household predictions for the users as well as confidence scores in those household predications for the users. This information is gathered from user profile objects 102, the action log 104, edge objects 106, content objects 108, external household data 110, and timeline data 112, as described above. The household prediction module 114 uses this information in at least one scoring model for assigning users to households. As more information is gathered about users of the social networking system 100, the household prediction module 114 may alter a scoring model for assigning users to households, giving more or less weight to a specific type of information, such as check-in events generated by users, external household data, information about other users connected to the user, and current locations listed in user profiles.

In one embodiment, the household prediction module 114 may classify users into various types of households, such as a single household, a married household, a non-married coupled household, and a family household with one or more children. The household prediction module 114 may use one or more fields in the user profile objects 102 associated with users that indicate familial relationships, such as being a son or daughter of one or more users, being married to a user, being the parent of one or more children, and so on. For example, a user with a child under the age of 18 may be assumed to live with the child. Thus, the user profile objects 102 associated with the parent and child may be categorized as a family household. This household classification may, in one embodiment, be used to assign users to households gathered from external household data 110.

Household objects 116 may be generated by the household prediction module 114. Household objects 116 may include an indication of a user that represents the head of household. A head of household may be defined as a user that files for federal income taxes as a head of household. A household object 116 also may list the names of persons included in the household represented by the household object 116. The household prediction module 114 may assign users of the social networking system 100 to a household by associating the household object 116 with user profile objects 102 associated with the users. In one embodiment, a user may be associated with multiple household objects 116 with separate confidence scores for the household objects 116. For example, a user under the age of 18 that splits her time between two parents may be part of two households. As another example, users that were roommates during a certain time period may be associated with a household object even after the users have ceased living together.

The household prediction module 114 may assign users to household objects 116 based on information gathered about the users of the social networking system 100, including user profile objects 102, action log 104, edge objects 106, content objects 108, external household data 110, and timeline data 112. A scoring model may be generated to determine a confidence score for each household membership prediction based on weighted factors, such as name correlation, location correlation, interest correlation, and social graph correlation. For example, a user named "John Smith" may potentially be associated with thousands of households. Using information extracted from the user profile object 102 associated with the user, the potential households may be narrowed to those near the current city where the user resides. The household prediction module 114 may also extrapolate the user's name to include variations and misspellings such as "J Smith," "Smith John," "J. A. Smith," "Johnny Smith," "Jon Smith," "John Smythe," and the like. Name correlation would measure how close the names match between the name extracted from a user profile object 102 and a name included in a household object 116. Similarly, a location correlation may indicate how close the location indicated for a household matches the location of a user of the social networking system 100.

In one embodiment, interests listed in the potential user profile objects 102 may be matched with external household data 110 about households that include a "John Smith." For example, users with an interest in sports may be matched to households associated with external household data 110 indicating magazine subscriptions to Sports Illustrated and Golf magazine. In this case, an interest correlation may be a positive correlation because interests extracted from the external household data 110 match with interests for the users. Finally, social graph correlation may indicate whether the social relationship indicated in a household matches the social graph relationship of users in the social networking system 100. For example, a household that includes two members, a married couple, may be associated with two users that have indicated they are married to each other. The social graph correlation would be 1.0 because the users social graph relationship, their married status, correlates directly with the social graph relationship indicated in the household. One or more scoring models may be generated to determine confidence scores for assigning users to households based on these correlations.

System Architecture

Figure 2:
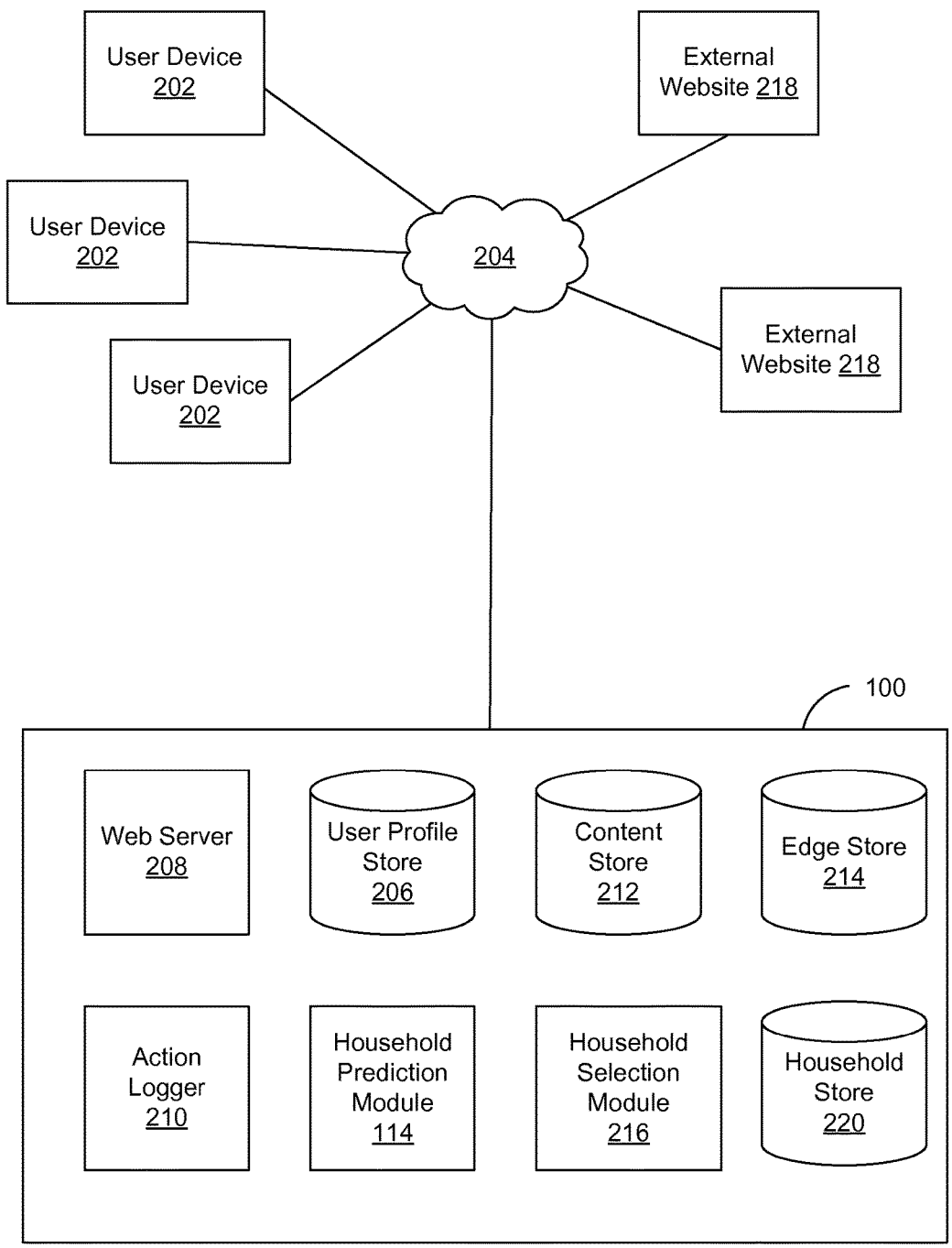
FIG. 2 is a network diagram of a system for assigning users of a social networking system to households, showing a block diagram of the social networking system, in accordance with an embodiment of the invention.

FIG. 2 is a high-level block diagram illustrating a system environment suitable for predicting locations of users based on social networking information, in accordance with an embodiment of the invention. The system environment comprises one or more user devices 202, the social networking system 100, a network 204, and external websites 218. In alternative configurations, different and/or additional modules can be included in the system.

The user devices 202 comprise one or more computing devices that can receive user input and can transmit and receive data via the network 204. In one embodiment, the user device 202 is a conventional computer system executing, for example, a Microsoft Windows-compatible operating system (OS), Apple OS X, and/or a Linux distribution. In another embodiment, the user device 202 can be a device having computer functionality, such as a personal digital assistant (PDA), mobile telephone, smart-phone, etc. The user device 202 is configured to communicate via network 204. The user device 202 can execute an application, for example, a browser application that allows a user of the user device 202 to interact with the social networking system 100. In another embodiment, the user device 202 interacts with the social networking system 100 through an application programming interface (API) that runs on the native operating system of the user device 202, such as iOS and ANDROID.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system 100. The social networking system 100 includes a user profile store 206, a web server 208, an action logger 210, a content store 212, an edge store 214, a household selection module 216, a household prediction module 112, and a household store 220. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system 100 via the network 204 to one or more user devices 202; the web server 208 serves web pages, as well as other web-related content, such as Java, Flash, XML, and so forth. The web server 208 may provide the functionality of receiving and routing messages between the social networking system 100 and the user devices 202, for example, instant messages, queued messages (e.g., email), text and SMS (short message service) messages, or messages sent using any other suitable messaging technique. The user can send a request to the web server 208 to upload information, for example, images or videos that are stored in the content store 212. Additionally, the web server 208 may provide API functionality to send data directly to native user device operating systems, such as iOS, ANDROID, webOS, and RIM.

Household objects 116 are generated by the household prediction module 114 in the social networking system 100, in one embodiment. As a user of the social networking system 100 is potentially matched to a household, a household object 116 for the household may be generated by the household prediction module 114. In another embodiment, household objects 116 are generated by a separate process. In yet another embodiment, a household object 116 is generated by the household prediction module 114 if one has not already been generated upon potentially matching a user of the social networking system 100 to the household. The household prediction module 114 generates household objects 116 for users of the social networking system 100 based on information about the households extracted from external household data 110 gathered from external websites 218. Household objects 116 are stored in the household store 220 for access by other modules of the social networking system 100. Household objects 116 representing households that have been determined to include selected users are associated with the selected users' user profile objects 102 stored in the user profile store 206, in one embodiment.

The action logger 210 is capable of receiving communications from the web server 208 about user actions on and/or off the social networking system 100. The action logger 210 populates the action log 104 with information about user actions to track them. Such actions may include, for example, adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well.

User account information and other related information for a user are stored in the user profile store 206. The user profile stored in user profile store 206 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system 100 displayed in an image. A user profile store 206 maintains profile information about users of the social networking system 100, such as age, gender, interests, geographic location, email addresses, credit card information, and other personalized information. The user profile store 206 also maintains references to the actions stored in the action log 104 and performed on objects in the content store 212, in one embodiment.

The edge store 214 stores the information describing connections between users and other objects on the social networking system 100. Some edges may be defined by users, allowing users to specify their relationships with other users. For example, users may generate edges with other users that parallel the users' real-life relationships, such as friends, co-workers, partners, spouses, and so forth. Other edges are generated when users interact with objects in the social networking system 100, such as expressing interest in a page on the social networking system, sharing a link with other users of the social networking system, and commenting on posts made by other users of the social networking system. The edge store 214 stores edge objects that include information about the edge, such as affinity scores for objects, interests, and other users.

The content store 212 stores content objects 108, such as photos, videos, status updates, and content items shared with users of the social networking system 100. Location information may be embedded in a content object 108, such as a digital photo in exchangeable image file format (EXIF). For example, a user may upload a photo from his mobile device to the social networking system 100. The location information embedded in the photo may be used to predict the location of the user. Other types of content objects 108, such as pages on the social networking system 100 that represent interests of users of the social networking system 100, places, businesses and other real-world entities, as well as external websites 218, are stored in the content store 212. User interactions with content objects 108 are stored in edge objects 106 in the edge store 214.

Household objects 116 are stored in the household store 220. Household objects 116 represent households that may vary in granularity, from single households, roommate households, married households, family households, and extended family households. Household objects 116 may be associated with user profile objects 102 for users of the social networking system with varying confidence scores. Confidence scores are generated by the household prediction module 114 upon associating users with households. Separate confidence scores may be associated with different household objects 116 when a user is associated with more than one household. Confidence scores may be determined using scoring models that use information about users, such as previous names, date of birth, location, life events, and check-ins.

For example, household objects 116 may be generated by the household prediction module 114 based on the received information about the user. One of the household objects 116 may include a prediction with a confidence score of 25 (where 1 is the lower bound and infinity is the upper bound) that the user is a member of the household. This household object 116 may be located in San Francisco, Calif. based on the received information linking the user and household, such as catalogs delivered to the user through the postal service. A separate confidence score may be associated with a different household object for another household located in Dallas, Tex. based on other information linking the user and the other household, such as a previous address on a department of motor vehicles record indicating that the user currently lives in Dallas, Tex. Confidence scores may be generated independent of each other. In one embodiment, conflicting household membership predictions, such as this instance, may be resolved by the household prediction module 114 using machine learning methods and weighted scoring models. In another embodiment, both household membership predictions are stored by associating the user's user profile object 102 with the two different household objects 116 with the two confidence scores. As a result, other modules using household information about the user may treat the information according to the confidences scores.

As another example, a household object 116 may be generated by the household prediction module 114 for a user based on a social graph correlation with a household. A social graph correlation may be determined based on high affinity scores between users, meaning that the users interact frequently on the social networking system 100. In another embodiment, a social graph correlation may be determined based on relationship status indicated in user profile objects 102 for users, such as a parent-child relationship, marriage, or domestic partnership. As a result of the social graph correlation, the users are associated with the household such that the users' user profile objects 102 are associated with the household object 116 for the household.

A household selection module 216 may be used by the social networking system 100 to select household objects 116 that have already been generated for assigning users of the social networking system 100 to households. As mentioned, household objects 116 may be generated by the household prediction module 114 upon assigning users to households, or may be generated by a separate process. The household selection module 216 selects household objects 116 that have been generated for assigning users to households represented by the household objects 116. In one embodiment, the household prediction module 114 uses the household selection module 216 to select household objects 116 from the household store 220 that may be potential matches for a user based on received information that may link the user and the household. If a household object 116 is not found by the household selection module 216, the household prediction module 114 generates the household object 116. Upon request for a household object 116, the household selection module 216 may provide a shared key that identifies the household object 116 to the entity performing the request. In one embodiment, the social networking system 100 may request the shared key. In another embodiment, a third-party vendor may request the shared key.

Generating Household Predictions for Users of a Social Networking System

Figure 3:
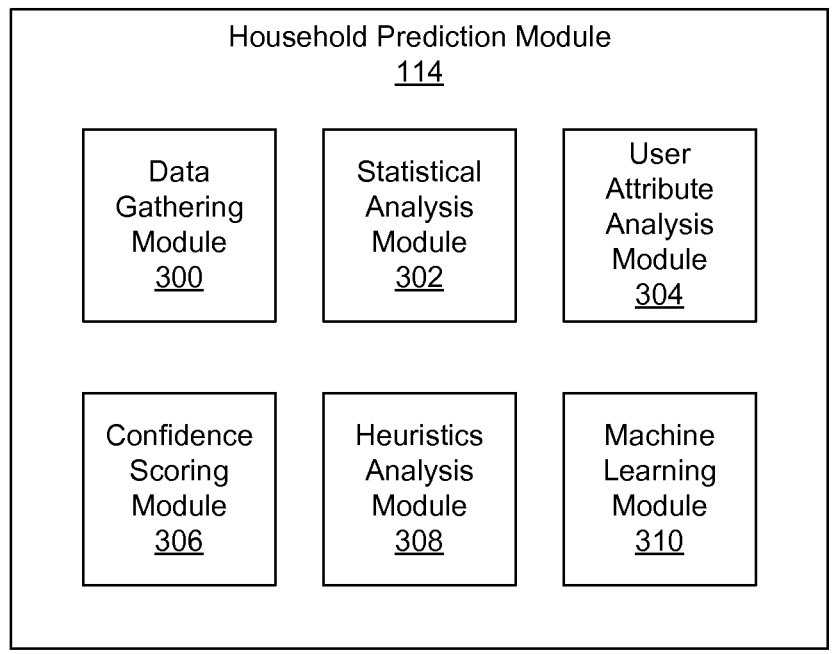
FIG. 3 is high-level block diagram illustrating a household prediction module that includes various modules for assigning users of a social networking system to households, in accordance with an embodiment of the invention.

FIG. 3 illustrates a high-level block diagram of the household prediction module 114 in further detail, in one embodiment. The household prediction module 114 includes a data gathering module 300, a statistical analysis module 302, a user attribute analysis module 304, a confidence module 306, a heuristics analysis module 308, and a machine learning module 310. These modules may perform in conjunction with each other or independently to generate location predictions for users of a social networking system 100.

A data gathering module 300 aggregates information linking users of the social networking system 100 to households. The data gathering module 300 may retrieve household information about users of the social networking system 100 from external systems, such as external household data 110 retrieved from external websites 218. Additionally, third-party vendors may be given access to a shared database on the social networking system 100 that provides external household data 110 to the social networking system 100 without sacrificing the privacy of users of the social networking system 100. Once the external household data 110 is analyzed to generate or select household objects 116, the users of the social networking system 100 may be assigned to households for further analysis. After the analysis is complete, data from households may be aggregated and the combined external household data 110 and user profiles may be destroyed to protect the privacy of users of the social networking system 100. In one embodiment, a third party vendor may be used to assign users of the social networking system 100 to households extracted from external household data 110 to protect the privacy of users. The data gathered by the data gathering module 300 may include user profiles, actions captured by the social networking system 100 on objects internal and external to the social networking system 100, social graph information extracted from edge objects 106 and content objects 108, location information extracted from user profile objects 102, edge objects 106, and content objects 108, external household data 110 such as department of motor vehicle registration records, magazine subscriptions, catalog mailers, voter registration records, and credit agency records, as well as timeline data 112 that includes life events such as graduations, marriages, moving to a new city, and births of children.

The statistical analysis module 302 analyzes received information about users on the social networking system 100 to predict household memberships of the users. In one embodiment, the statistical analysis module 302 analyzes the information received about a user and searches for one or more households that match the user. Using factors such as previous names, date of birth, location, life events, and check-ins, potential households may be filtered to match the user. The statistical analysis module 302 may determine a probability that the user is a member of a household based on these factors. In one embodiment, social graph information is used to further determine a probability that a user is a member of a household based on other members of the household and whether they are close connections to the user or whether they have a familial relationship with the user. Statistical analysis may also be performed by the statistical analysis module 302 to determine a probability, based on the received information about the user linking the user to the household, that the user is a member of the household based on past predictions and historical household data.

Statistical analysis is also performed to improve the weights of the different types of data used in data models and also used to measure performance, such as providing an error rate. Statistical analysis information about the received household information may be used by administrators of the social networking system 100 to provide better search results to users, obtain a deeper understanding of users' household memberships, and provide better targeting criteria for advertisers.

A user attribute analysis module 304 analyzes received information linking a user to a household object 116. User attributes, such as age, gender, location, profession, and interests, may be analyzed by the user attribute analysis module 304 to filter potential household objects 116 for the user. In one embodiment, statistical analysis may be computed by the statistical analysis module 302 based on one or more of the analyzed user attributes. For example, a household with a thirty-four year old male married to a thirty-three year old female that subscribes to Sports Illustrated and Vogue magazines in Mountain View, Calif. may be matched to a married couple of users that have matching user attributes of age, gender, social graph relationship status, and interests in sports and fashion. These factors may be weighted differently in a scoring model to determine a confidence score for assigning users to households. An initial set of weights may be assigned by administrators of the social networking system 100. The weights may be adjusted over time using machine learning algorithms based on user feedback and information received about the accuracy of the household predictions, in one embodiment. In another embodiment, the weights may be adjusted using machine learning methods based on data gathered by the social networking system 100.

A confidence scoring module 306 generates a confidence score for each household membership prediction generated by the household prediction module 114. A confidence score may be determined based on a scoring model for the household predictions. Confidence scores may range from 0 to 100. A low confidence score, such as 10 or 15, may indicate that there are multiple households in which a user may be associated. Different types of households may have different scoring models for determining confidence scores. For example, a married household type may heavily weight social graph relationship status information about married users in the calculation of the confidence score for the household prediction. As another example, a family household type may compute a confidence score using other information, such as bursts of communications regarding the birth of a child, extracted tag information from photo uploads of a baby with two users being tagged to one face, and status messages with keywords like "baby," "birth," and "child." Thus, a married couple of users that have recently had a baby may be assigned to a household with confidence scores using two different scoring models.

Scoring models used by the confidence scoring module 306 may use various factors in determining whether a user is a member of a household, including date of birth, previous names, location, check-in events, timeline data, social graph information, and interests. Weights may be used emphasize one factor over another, as determined by administrators of the social networking system 100. Weights may also be trained by machine learning algorithms based on received information linking users of the social networking system 100 to households.

A heuristics analysis module 308 operates independently and asynchronously from the other modules in the household prediction module 114. The heuristics analysis module 308 performs various steps to gather information from the social networking system 100. For example, the action log 104 includes actions that users perform on the social networking system. The heuristics analysis module 308 may be used to analyze the level of communications activity for particular users and determine whether those communications included certain keywords, such as "baby" as described above.

Another use of the heuristics analysis module 308 includes gathering and analyzing different types of information about a user's geographic location such as check-ins at places in a specific geographic location, attending events in the same geographic region, receiving requests for connecting with users from the same geographic area, and geo-location codes embedded in photos and other communications, such as text messages, uploaded to the social networking system by the user. The heuristics analysis module 308 may conclude, for example, that although a user may indicate in her profile that she currently lives in Oakland, Calif., she frequently attends events in affluent communities such as Atherton, Calif. and Menlo Park, Calif. and posts multiple check-ins at high-end boutique shops in Palo Alto, Calif. In conjunction with the statistical analysis module 302 and the location type analysis module 304, the heuristics analysis module 308 may help to predict the real-time location of the user as Palo Alto, Calif., even though her profile information indicates that she lives in Oakland, Calif. The heuristics analysis module 308 may be used to resolve these location conflicts. This location information may be used as a factor in assigning users of a social networking system 100 to a household based on the location of the household matching, or being close to, the location determined or inferred for a user.

The heuristics analysis module 308 may, in one embodiment, track a user's membership in households over a period of time. A user may be in a single household type, then get a roommate and be in a cohabitation non-married household type. The user may then get married and be a member of a married household type and then have a baby and be a member of a familial household type. As a result, the user may be associated with four different households, represented by four different household objects 116. The heuristics analysis module 308 may identify that the user has progressed from one household type to another, meaning that the most current household is the only active household for that user. Thus, this information may be stored by the heuristics analysis module 308 in the household objects 116 associated with the user.

A machine learning module 310 may be used in the household prediction module 114 to refine the weights used for making household predictions. In one embodiment, a social networking system 100 uses a machine learning algorithm to retrain weights in the household prediction module 114. Using the data gathered by the social networking system 100 that links a user with a household, the machine learning module 310 may be used to train scoring models for determining confidence scores.

Figure 4:
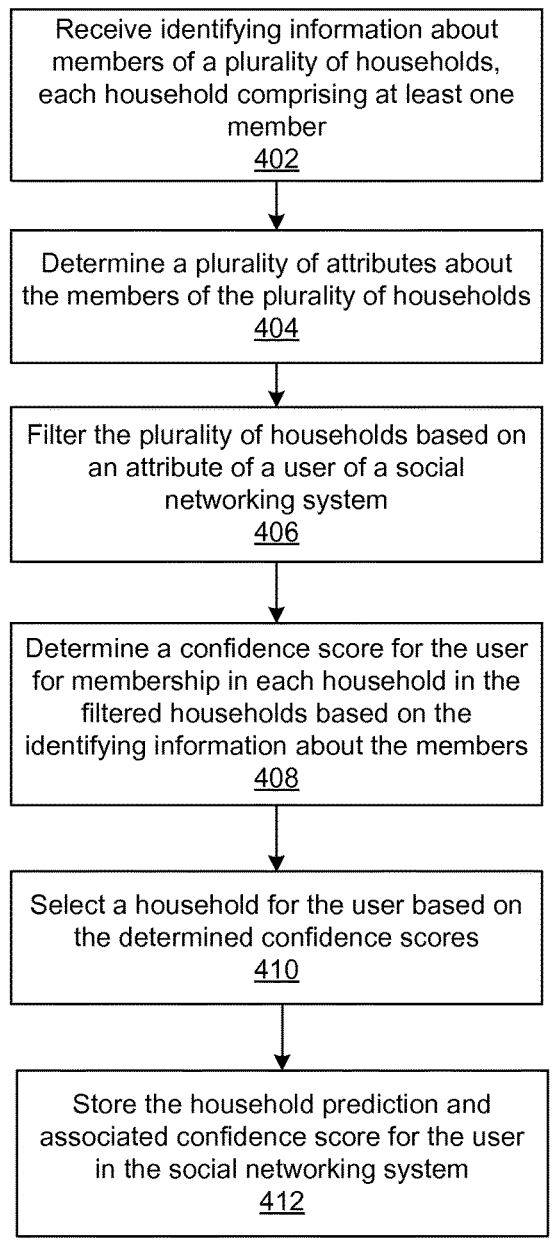
FIG. 4 is a flowchart of a process of assigning users of a social networking system to households, in accordance with an embodiment of the invention.

FIG. 4 illustrates a flow chart diagram depicting a process of assigning users of a social networking system to households, in accordance with an embodiment of the invention. Identifying information about members of a plurality of households is received 402, each household comprising at least one member. This household information may include external household data 110, social graph relationship information stored in the social networking system 100, and household information shared by third-party vendors and provided to the social networking system 100.

After the identifying information about members of a plurality of households is received 402, a plurality of attributes about the members of the plurality of households is determined 404. In one embodiment, the social networking system 100 analyzes the attributes of the members of the plurality of households, such as age, gender, name, location, interests, and social graph relationship status, such as whether the members are married, single, divorced, domestic partners, have children, have roommates, etc. These attributes may be determined 404 based on information listed in a database or based on information extracted from external household data 110 such as vehicle registration records, marriage license records, voting records, income tax statements, and credit agency reports.

Once a plurality of attributes about the members of the plurality of households is determined 404, the plurality of households may be filtered 406 based on an attribute of a user of a social networking system. For example, a user with a name "John Smith" living in Malibu, Calif. has the location attribute of Malibu, Calif. Thus, households that are not located in Malibu, Calif. may be filtered 406. The attribute of the user used to filter households may be selected by the social networking system 100 according to machine learning methods that may help identify attributes that are optimal for filtering households. As another example, households may be filtered according to the age, gender, and interests of a user named "Brittany S. Pierce" living in Lima, Ohio, in addition to the name matching.

A confidence score is determined 408 for the user for membership in each household in the filtered household based on the identifying information about the members. A confidence score for each household is determined 408 based on a scoring model that includes various factors, such as previous names, date of birth, location, check-in events, interests, lifetime events, and social graph information. In one embodiment, a scoring model may be generated for each of the different types of households, such as single household, married household, cohabitating non-married household, domestic partner household, family household with children, and so on.

After confidence scores are determined 408 for household predictions, a household for the user is selected 410 based on the determined confidence scores. In one embodiment, more than one household may be selected 410 for the user based on the received information linking the user to the multiple households. In another embodiment, a household may be selected 410 based on the highest confidence score. The household prediction and associated confidence score for the user are then stored 412 in the social networking system.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving a plurality of information items about a user of a social networking system;
generating a household object associated with the user in the social networking system based on the plurality of information items about the user;
determining one or more members of a household represented by the household object in the social networking system based on the received plurality of information items about the user, where the user is a member of the household; and
storing the household object in association with the determined one or members of the household in the social networking system.

2. The method of claim 1, wherein receiving a plurality of information items about a user of a social networking system comprises:
retrieving household data about the user from external resources based on a name of the user and an address of the user extracted from a user profile for the user stored in the social networking system.

3. The method of claim 2, wherein household data about the user retrieved from external resources further comprises one or more records from a department of motor vehicles.

4. The method of claim 2, wherein household data about the user retrieved from external resources further comprises one or more records from a tax agency.

5. The method of claim 2, wherein household data about the user retrieved from external resources further comprises one or more records from a magazine publisher.

6. The method of claim 2, wherein household data about the user retrieved from external resources further comprises one or more records from a postal service agency.

7. The method of claim 2, wherein household data about the user retrieved from external resources further comprises one or more records from a voter registration agency.

8. The method of claim 2, wherein household data about the user retrieved from external resources further comprises one or more records from a credit agency.

9. The method of claim 1, wherein determining one or more members of a household comprises:
determining a spouse of the user to be a member of the household, where the spouse comprises another user of the social networking system married to the user based on relationship information included in a user profile of the user and the spouse.

10. The method of claim 1, wherein determining one or more members of a household comprises:
determining a child of the user to be a member of the household, where the child comprises another user of the social networking system connected to the user based on relationship information included in a user profile of the user and the child.

11. The method of claim 1, wherein determining one or more members of a household comprises:
determining a roommate of the user to be a member of the household, where the roommate comprises another user of the social networking system having an equivalent address as the user based on an address of the user extracted from a user profile for the user stored in the social networking system.

12. The method of claim 1, wherein determining one or more members of a household comprises:
determining a particular user connected to the user in the social networking system to be a member of the household, where the social networking system has determined a social graph correlation between the particular user and the user based on a plurality of affinity scores between the particular user and the user exceeding a predetermined threshold.

13. A method comprising:
retrieving a plurality of information items about a user of a social networking system;
determining one or more membership scores for the user for one or more households in the social networking system using a scoring model based on the plurality of information items about the user;
selecting a household from the one or more households in the social networking system based on the one or more memberships scores for the user; and
storing an association of the selected household with the user in the social networking system.

14. The method of claim 13, wherein determining one or more membership scores for the user for one or more households in the social networking system using a scoring model based on the plurality of information items about the user comprises:
retrieving a relationship status of the user as an information item of the retrieved plurality of information items;
retrieving a scoring model for the user based on the retrieved relationship status of the user; and
determining a membership score for the user for one or more households in the social networking system using the retrieved scoring model based on the plurality of information items.

15. The method of claim 13, wherein determining one or more membership scores for the user for one or more households in the social networking system using a scoring model based on the plurality of information items about the user comprises:
retrieving a life event of the user as an information item of the retrieved plurality of information items;
retrieving a scoring model for the user based on the retrieved life event of the user; and
determining a membership score for the user for one or more households in the social networking system using the retrieved scoring model based on the plurality of information items.

16. The method of claim 13, where a household comprises one or more household properties.

17. The method of claim 16, where a household property comprises a single household type.

18. The method of claim 16, where a household property comprises a married household type.

19. The method of claim 16, where a household property comprises a roommate household type.

20. The method of claim 16, where a household property comprises a family household type.

21. The method of claim 16, where a household property comprises an extended family household type.

22. The method of claim 16, where a household property comprises one or more interests associated with one or more members of the household.

23. The method of claim 16, where a household property comprises a geographical location.

24. The method of claim 16, where a household property comprises one or more genders associated with one or members of the household.

25. The method of claim 16, where a household property comprises one or more ages associated with one or members of the household.

26. A non-transitory computer-readable storage medium storing executable computer program instructions, the instructions executable to perform steps comprising:
receiving a plurality of information items about a user of a social networking system;
generating a household object associated with the user in the social networking system based on the plurality of information items about the user;
determining one or more members of a household represented by the household object in the social networking system based on the received plurality of information items about the user, where the user is a member of the household; and
storing the household object in association with the determined one or members of the household in the social networking system.

27. The non-transitory computer-readable storage medium of claim 26, wherein receiving a plurality of information items about a user of a social networking system comprises:
retrieving household data about the user from external resources based on a name of the user and an address of the user extracted from a user profile for the user stored in the social networking system.

28. The non-transitory computer-readable storage medium of claim 27, wherein household data about the user retrieved from external resources further comprises one or more records from a department of motor vehicles.

29. The non-transitory computer-readable storage medium of claim 27, wherein household data about the user retrieved from external resources further comprises one or more records from a tax agency.

30. The non-transitory computer-readable storage medium of claim 27, wherein household data about the user retrieved from external resources further comprises one or more records from a magazine publisher.

31. The non-transitory computer-readable storage medium of claim 27, wherein household data about the user retrieved from external resources further comprises one or more records from a postal service agency.

32. The non-transitory computer-readable storage medium of claim 27, wherein household data about the user retrieved from external resources further comprises one or more records from a voter registration agency.

33. The non-transitory computer-readable storage medium of claim 27, wherein household data about the user retrieved from external resources further comprises one or more records from a credit agency.

34. The non-transitory computer-readable storage medium of claim 26, wherein determining one or more members of a household comprises:
determining a spouse of the user to be a member of the household, where the spouse comprises another user of the social networking system married to the user based on relationship information included in a user profile of the user and the spouse.

35. The non-transitory computer-readable storage medium of claim 26, wherein determining one or more members of a household comprises:
determining a child of the user to be a member of the household, where the child comprises another user of the social networking system connected to the user based on relationship information included in a user profile of the user and the child.

36. The non-transitory computer-readable storage medium of claim 26, wherein determining one or more members of a household comprises:
determining a roommate of the user to be a member of the household, where the roommate comprises another user of the social networking system having an equivalent address as the user based on an address of the user extracted from a user profile for the user stored in the social networking system.

37. The non-transitory computer-readable storage medium of claim 26, wherein determining one or more members of a household comprises:
determining a particular user connected to the user in the social networking system to be a member of the household, where the social networking system has determined a social graph correlation between the particular user and the user based on a plurality of affinity scores between the particular user and the user exceeding a predetermined threshold.

38. A non-transitory computer-readable storage medium storing executable computer program instructions, the instructions executable to perform steps comprising:
retrieving a plurality of information items about a user of a social networking system;
determining one or more membership scores for the user for one or more households in the social networking system using a scoring model based on the plurality of information items about the user;
selecting a household from the one or more households in the social networking system based on the one or more memberships scores for the user; and
storing an association of the selected household with the user in the social networking system.

39. The non-transitory computer-readable storage medium of claim 38, wherein determining one or more membership scores for the user for one or more households in the social networking system using a scoring model based on the plurality of information items about the user comprises:
retrieving a relationship status of the user as an information item of the retrieved plurality of information items;
retrieving a scoring model for the user based on the retrieved relationship status of the user; and
determining a membership score for the user for one or more households in the social networking system using the retrieved scoring model based on the plurality of information items.

40. The non-transitory computer-readable storage medium of claim 38, wherein determining one or more membership scores for the user for one or more households in the social networking system using a scoring model based on the plurality of information items about the user comprises:
retrieving a life event of the user as an information item of the retrieved plurality of information items;
retrieving a scoring model for the user based on the retrieved life event of the user; and
determining a membership score for the user for one or more households in the social networking system using the retrieved scoring model based on the plurality of information items.

41. The non-transitory computer-readable storage medium of claim 38, where a household comprises one or more household properties.

42. The non-transitory computer-readable storage medium of claim 41, where a household property comprises a single household type.

43. The non-transitory computer-readable storage medium of claim 41, where a household property comprises a married household type.

44. The non-transitory computer-readable storage medium of claim 41, where a household property comprises a roommate household type.

45. The non-transitory computer-readable storage medium of claim 41, where a household property comprises a family household type.

46. The non-transitory computer-readable storage medium of claim 41, where a household property comprises an extended family household type.

47. The non-transitory computer-readable storage medium of claim 41, where a household property comprises one or more interests associated with one or more members of the household.

48. The non-transitory computer-readable storage medium of claim 41, where a household property comprises a geographical location.

49. The non-transitory computer-readable storage medium of claim 41, where a household property comprises one or more genders associated with one or members of the household.

50. The non-transitory computer-readable storage medium of claim 41, where a household property comprises one or more ages associated with one or members of the household.

\* \* \* \* \*

UNITED STATES PATENT AND TRADEMARK OFFICE
CERTIFICATE OF CORRECTION

PATENT NO. : 9,679,044 B2
APPLICATION NO. : 13/677885
DATED : June 13, 2017
INVENTOR(S) : Sean Michael Bruich et al.

Page 1 of 1

It is certified that error appears in the above-identified patent and that said Letters Patent is hereby corrected as shown below:

In the Claims

Column 17, Line 2, after "or," insert -- more --.

Column 17, Line 5, after "or" insert -- more --.

Signed and Sealed this
Thirteenth Day of February, 2018

Andrei Iancu
*Director of the United States Patent and Trademark Office*